Jan. 31, 1928.
P. R. CURTIS
WINDSHIELD CLEANER
Filed June 13, 1927
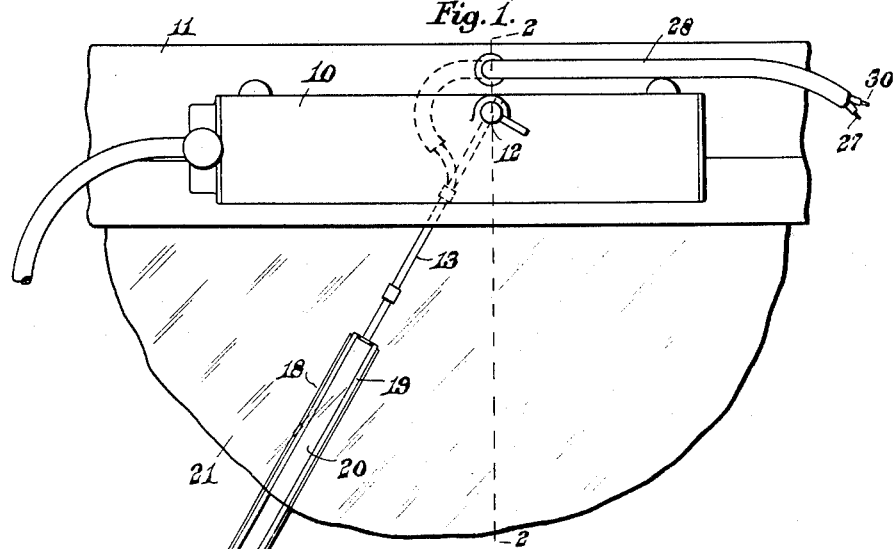
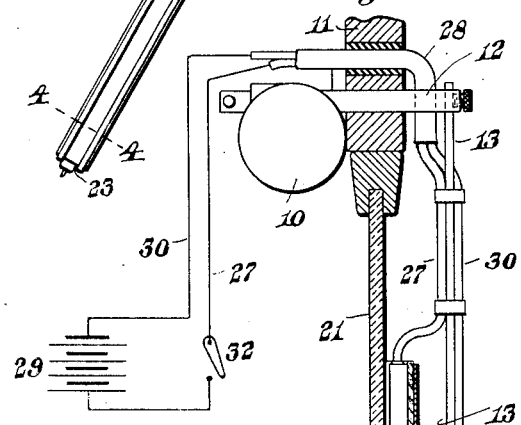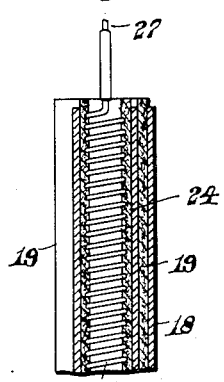
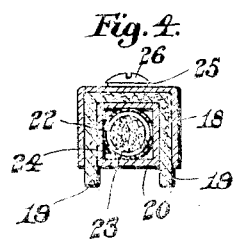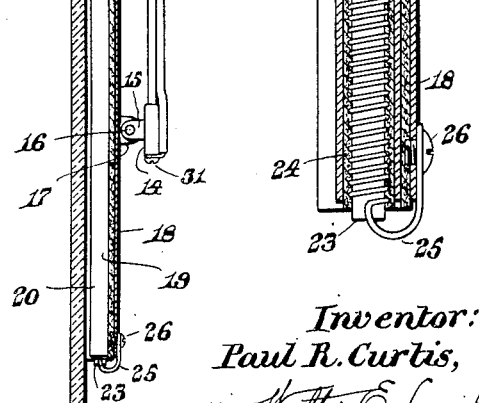
Inventor:
Paul R. Curtis,
by Walter E. Lombard,
Atty.

Patented Jan. 31, 1928.

1,657,916

UNITED STATES PATENT OFFICE.

PAUL R. CURTIS, OF BRAINTREE, MASSACHUSETTS.

WINDSHIELD CLEANER.

Application filed June 13, 1927. Serial No. 198,438.

This invention relates to windshield cleaners and has for its object the provision of heating means attached to the wiper member and adapted to be used to prevent the formation of ice or frost on the face of the windshield during cold inclement weather, said heating means being so installed as to interfere in no way with usual operation of the wiper during warm weather.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of a portion of a windshield having applied thereto a cleaner embodying the principles of the present invention.

Figure 2 represents a transverse vertical section of same on line 2, 2, on Fig. 1.

Figure 3 represents a longitudinal section of the wiper member drawn to an enlarged scale, and Figure 4 represents a transverse section of the wiper member, also drawn to an enlarged scale.

Similar characters indicate like parts throughout the several figures of the drawing.

In the drawings 10 is a cylinder secured to the windshield frame 11 and containing the usual mechanism for oscillating the laterally projecting shaft 12.

As the shaft operating mechanism forms no part of the present invention it is deemed unnecessary to illustrate and describe the same in detail.

To the outer end of the shaft 12 is secured an arm 13 to the outer end of which is secured a block 14 provided with an ear 15 pivotally connected at 16 to an ear 17 projecting from a U-shaped member 18.

Within this member 18 is disposed a strip of wiping material such as felt 19, said strip being retained therein by a metal tube 20 which is forced into the member 18 so that the body of said strip will be interposed between the wall of the tube 20 and the inner wall of the member 18.

When thus disposed within the U-shaped member 18 the opposite edges of the strip 19 will project beyond the side walls of the member into contact with the outer face of the glass 21 of the windshield.

By means of this construction there are always two wipers in contact with the glass 21 of the windshield, one on each side of the tube 20 and extending the entire length thereof.

In warm weather when rain strikes the outer face of the windshield glass 21 the wiper strips 19 will be sufficient to keep the glass clear when the cleaner is in operation.

In cold weather when sleet and snow strike the glass 21 it is almost impossible to keep the glass clear by the usual operation of the cleaner.

Under such conditions the glass becomes frosted to such an extent that the view of the car operator is obstructed and accidents are very liable to occur as a result.

To overcome this difficulty is the principal object of the present invention and this has been found possible by inserting a heating unit within the tube 20 and providing means for placing such unit in commission when needed.

This unit consists of a fine resistance wire 22 coiled about a core 23 of asbestos and also surrounded by a layer 24 of asbestos. The core 23 is found convenient to use but may be omitted if desired.

One end 25 of the coil 22 is connected by screw 26 to the metal U-shaped member 18 while the other end 27 thereof extends through a tube 28 to one pole of the battery 29.

From the other pole of the battery 29 extends a wire 30 which passes through the tube 28 and has its other end secured to the block 14 by means of the screw 31, thus forming a complete electric circuit.

In the line 27 is a switch 32 of any desired construction which under all ordinary conditions is open so that the heating unit will be out of commission.

When the windshield begins to be frosted the switch 32 should be closed thereby completing the electric circuit and causing a current to be conducted through the resistance coil 22.

Sufficient heat will be generated in this manner to melt the snow and ice on the glass 21 so that it may be easily removed by the wiper 19 as it oscillates in contact with said glass 21.

As a consequence the operator obtains a clear vision at all times and under all kinds of weather conditions.

It is believed that the operation and many advantages of the invention will be understood without further description.

Having thus described my invention, I claim—

1. A windshield cleaner provided with a movable U-shaped member; a tube within said member; a strip of felt surrounding said tube with its edges projecting beyond the walls of said member in contact with the face of the windshield; and a heating unit within said tube.

2. A windshield cleaner provided with a movable U-shaped member; a tube within said member; a strip of felt surrounding said tube with its edges projecting beyond the walls of said member in contact with the face of the windshield; a coil of wire within said tube; and means for conducting an electric current through said coil.

3. A wiper arm for windshield cleaner comprising a channelled holder; a single wiper strip within said holder with its opposite edges projecting therebeyond for engagement with the outer face of a windshield; an electric heating unit within the channelled holder between the opposite sides of the wiper strip and clamping said strip into contact with the holder.

4. A wiper arm for windshield cleaner comprising a channelled holder; a single wiper strip within said holder with its opposite edges projecting therebeyond for engagement with the outer face of a windshield; a tube disposed between the opposite sides of the wiper strip and clamping said strip into contact with said holder; a coil of fine wire within said tube; an insulating covering between said coil and tube; and means for transmitting a current of electricity through said coil.

Signed by me at 746 Old South Bldg., Boston, Mass., this 10th day of June, 1927.

PAUL R. CURTIS.